United States Patent
Ekenberg et al.

(10) Patent No.: US 9,725,092 B2
(45) Date of Patent: Aug. 8, 2017

(54) METHOD, HOST VEHICLE AND FOLLOWING SPACE MANAGEMENT UNIT FOR MANAGING FOLLOWING SPACE

(71) Applicant: VOLVO CAR CORPORATION, Gothenburg (SE)

(72) Inventors: Andreas Ekenberg, Torslanda (SE); Oskar Nordin, Gothenburg (SE); Erik Stenborg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 93 days.

(21) Appl. No.: 14/625,927

(22) Filed: Feb. 19, 2015

(65) Prior Publication Data
US 2015/0246677 A1 Sep. 3, 2015

(30) Foreign Application Priority Data
Feb. 28, 2014 (EP) ..................................... 14157111

(51) Int. Cl.
*B60W 30/16* (2012.01)
*B60W 10/10* (2012.01)

(52) U.S. Cl.
CPC .......... *B60W 30/16* (2013.01); *B60T 2201/02* (2013.01); *B60W 2550/302* (2013.01); *B60W 2550/308* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,235,316 A * | 8/1993 | Qualizza | ................... | G01S 7/58 180/167 |
| 5,289,321 A * | 2/1994 | Secor | ..................... | B60K 35/00 348/118 |
| 5,325,096 A * | 6/1994 | Pakett | ..................... | G01S 13/52 342/70 |
| 5,424,952 A * | 6/1995 | Asayama | ................ | G01S 11/12 340/435 |
| 6,256,574 B1 * | 7/2001 | Prestl | ................. | B60K 31/0008 180/170 |

(Continued)

FOREIGN PATENT DOCUMENTS

| | | |
|---|---|---|
| DE | 102007029483 | 1/2009 |
| DE | 102008011228 | 8/2009 |
| DE | 102010020047 | 1/2011 |

OTHER PUBLICATIONS

Extended European Search Report for European Application No. 14157111.7, Completed by the European Patent Office, Dated Aug. 26, 2014, 9 Pages.

*Primary Examiner* — Yonel Beaulieu
(74) *Attorney, Agent, or Firm* — Brooks Kushman P.C.

(57) ABSTRACT

A method and a following space management unit of a host vehicle for managing a following space are disclosed. The following space management unit obtains a set of parameters including one or more of a difference parameter, indicating a difference between a velocity of the host vehicle and a speed limit for the host vehicle at a current location, and a road marking parameter, indicating whether a surrounding vehicle is allowed to enter the current lane. The following space management unit determines the following space based on the set of parameters.

12 Claims, 2 Drawing Sheets

(56) References Cited

U.S. PATENT DOCUMENTS

| | | | |
|---|---|---|---|
| 6,292,737 B1* | 9/2001 | Higashimata | B60K 31/0008 180/167 |
| 7,280,903 B2* | 10/2007 | Arai | B60W 30/16 340/435 |
| 7,337,056 B2* | 2/2008 | Arai | B60K 31/0008 180/170 |
| 8,615,357 B2 | 12/2013 | Simon | |
| 8,854,251 B2* | 10/2014 | Tokoro | G01S 13/34 342/104 |
| 2003/0120414 A1* | 6/2003 | Matsumoto | B60K 31/0008 701/96 |
| 2007/0198191 A1* | 8/2007 | Olney | B60K 31/0008 701/301 |
| 2008/0040004 A1* | 2/2008 | Breed | B60R 21/0134 701/45 |
| 2009/0271084 A1 | 10/2009 | Taguchi | |
| 2010/0045449 A1* | 2/2010 | Stein | G06T 7/2006 340/435 |
| 2015/0246676 A1* | 9/2015 | Keren | B60W 30/146 701/93 |
| 2015/0266477 A1* | 9/2015 | Schmudderich | B60W 30/09 701/98 |
| 2016/0167582 A1* | 6/2016 | Chen | B60R 1/00 348/148 |
| 2017/0015354 A1* | 1/2017 | Nilsson | G08G 1/167 |

* cited by examiner

METHOD, HOST VEHICLE AND FOLLOWING SPACE MANAGEMENT UNIT FOR MANAGING FOLLOWING SPACE

CROSS-REFERENCE TO RELATED APPLICATIONS

This application claims foreign priority benefits under 35 U.S.C. §119(a)-(d) to European patent application number EP 14157111.7, filed Feb. 28, 2014, which is incorporated by reference in its entirety.

TECHNICAL FIELD

Embodiments herein relate to the field of automotive technologies. In particular, a method and a following space management unit for managing a following space of a host vehicle are disclosed. Moreover, a host vehicle corresponding thereto is disclosed.

BACKGROUND

Adaptive Cruise Control (ACC) has been available for sales in automobiles for a long time. In fact, as early as the 1910s a centrifugal governor was used in automobiles to control the velocity thereof. Modern ACC systems are configured to control vehicle velocity such that it matches a set speed given by a driver. The ACC systems are normally configured to control the velocity of a vehicle such that a safe distance is maintained to a preceding vehicle. Such control is based on sensor input from on-board sensors such as RADAR (RAdio Detection And Ranging) or LASER (Light Amplification by Stimulated Emission of Radiation) sensors, allowing the vehicle to slow down when approaching another vehicle ahead and accelerate again to the a pre-set speed when traffic allows. ACC system is sometimes regarded as a key component in future generations of cars and has an impact on e.g. driver safety.

However, ACC systems fail to control host vehicle velocity to match a safe and/or pleasant vehicle velocity in many driving situations. As a result, vehicle drivers have to manually control host vehicle velocity in such driving situations. Examples of such driving situations are driving on curved or hilly road, city driving, driving on a road comprising road bumps, roundabouts, intersections, multi-lane highways etc. Ideally, the ACC system should be able to continuously control speed to match a speed which a driver would choose when driving without the ACC system actively controlling the speed.

In a known example, a driver activates the ACC system and sets a following distance to cars preceding a vehicle in which the driver sits. In this example, the driver is able to select from a number of pre-set, or predetermined, following distances. A problem is that the driver tends to change the pre-set following distance for various reasons. Since the driver needs to change the pre-set following distance to another pre-set following distance, the driver may feel that usability of the ACC system is not satisfying.

US2009/0271084 discloses a cruise control system including a traffic condition acquisition unit that acquires a traffic condition that includes a vehicle density on a road on which a vehicle runs. Furthermore, the cruise control system includes a cruise control unit that performs cruise control on the vehicle so that a following distance has a less tendency to decrease as the road gets busier. The following distance refers to distance, measured in terms or meters or seconds, to a vehicle preceding the present vehicle. A problem with the cruise control system may be that the following distance may still not be optimal in some situations. In these situations, a surrounding vehicle is able to cut in in front of the vehicle, since the cruise control system has a less tendency to decrease the following distance as the road gets busier. Consequently, the vehicle may come at a disadvantage with respect to surrounding vehicles which as mentioned cut in in front of the vehicle.

SUMMARY

An object is to alleviate, or at least reduce, the above mentioned problem and similar problems.

According to a first aspect, the object is achieved by a method, performed by a following space management unit of a host vehicle, for managing a following space relating to a time for the host vehicle to reach a preceding vehicle location at which a preceding vehicle, preceding the host vehicle, is currently located. The host vehicle is travelling with a velocity and has a current location on a road. The host vehicle is travelling in a current lane of the road. The following space management unit obtains a set of parameters comprising one or more of: a difference parameter, indicating a difference between the velocity and a speed limit for the host vehicle at the current location; and a road marking parameter, indicating whether a road marking on the road indicates that a surrounding vehicle is allowed to enter the current lane. The surrounding vehicle is travelling in a lane of the road. The lane is adjacent to the current lane. The following space management unit determines the following space based on the set of parameters.

With respect to the difference parameter, which may be given as a ratio between the velocity and the speed limit, it may be that the surrounding vehicle enter the current lane when allowed if the host vehicle is following the preceding vehicle with a too large following space. Hence, a determination of the following space, based on the set of parameters when the set of parameters includes the difference parameter, may reduce the following space when the difference parameter is below one. Thereby, the surrounding vehicle(s) are prevented from excessively cutting in in front of the host vehicle. This means that the difference parameter may give an indication about if traffic flows smoothly on the road, e.g. the difference parameter is at or above one, or if traffic is jammed, or almost jammed, e.g. the difference parameter is below one. For the case when traffic is jammed, a margin may be added by use of a threshold value that is less than one, e.g. 0.8 .

With respect to the road marking parameter, it may be that the surrounding vehicle enters the current lane when allowed if the host vehicle is following the preceding vehicle with a too large following space. Hence, a determination of the following space, based on the set of parameters when the set of parameters includes the road marking parameter, may reduce the following space when the surrounding vehicle is allowed to enter the current lane. Thereby, the above mentioned object is achieved.

The following space may be a following time, a following distance, a time period, a time gap, a time value, a distance value or the like, which relates to distance between the host vehicle and the preceding vehicle and/or to time for the host vehicle to reach the preceding vehicle location. Hence, the following space may refer to a period or interval in terms of time and/or a distance or interval in terms of length.

The road marking parameter may comprise, or may be indicated by, one or more of: a first line parameter, indicating whether a first line on the road indicates that the surrounding vehicle is allowed to enter the current lane from a left hand side of the host vehicle relative to a travelling direction thereof; and a second line parameter, indicating whether a second line on the road indicates that the surrounding vehicle is allowed to enter the current lane from a right hand side of the host vehicle relative to a travelling direction thereof. In this manner, the road marking parameter may be divided into the first line parameter and the second line parameter, which provides information about whether entrance of the surrounding vehicle from the left and right hand side of the vehicle, respectively, is allowed. Typically, in case cars travel on the right hand side of the road, vehicles may be allowed into the current lane from the right more generously than from the left. In this manner, greater consideration may e.g. be taken towards vehicles entering a multi-lane highway or the like.

The set of parameters may comprise, or may be indicated by: an average following space parameter relating to an average time between a plurality of surrounding vehicles in the lane or lanes adjacent to the current lane. The average following space parameter may relate to an average of following spaces for respective pairs of vehicles in the lane or the lanes, which are located adjacent to the current lane.

The set of parameters may comprise, or may be indicated by, one or more of: a first set of following space parameters, indicating a first group of a plurality of surrounding vehicles that are travelling in a left lane to the left relatively to a travelling direction of the host vehicle; and a second set of following space parameters for a second group of a plurality of surrounding vehicles that are travelling in a right lane to the right relatively to a travelling direction of the host vehicle. In this manner, it is allowed for different treatment, or consideration, towards vehicles in the right and left lanes.

The determination of the following space may comprise, or be performed by, that the following space management unit may calculate the following space from the set of parameters by use of a formula. Exemplifying formulas are given in the detailed description below.

The following space may be a recorded following space associated with the set of parameters according to a database including sets of parameters associated with recorded following spaces. This may mean that the following space may be determined by looking up the set of parameters in a database to find the recorded following space mapped to, or associated with, the set of parameters. Exemplifying manners of generating the database is described in the detailed description below.

The recorded following spaces and the associated set of parameters may be acquired when the following space management unit is active with respect to control of the estimated speed of the host vehicle according to a following space which is set manually. In this manner, the database may obtain information from how a driver of the host vehicle tunes or adjusts the set of parameters for management of the following space. Hence, the management of the following space performed by the following space management unit may resemble the driver's behaviour.

Alternatively, the recorded following spaces and the associated set of parameters may be acquired when the following space management unit is inactive with respect to management of the following space. In this case, the following space is management completely in the control of the driver. The following space management unit merely records the parameters for various following spaces.

In these manners, following space may be adapted according to which following space has been chosen, or held, when the vehicle has been operated by the driver, with or without active following space management. Hence, the following space may be determined in a desirable manner, which resembles the driver's preference, while it shall be assured that such associated set of parameters lay within certain safety margins.

According to a second aspect, the object is achieved by a following space management unit for a host vehicle. The following space management unit is configured to manage a following space relating to a time for the host vehicle to reach a preceding vehicle location at which a preceding vehicle, preceding the host vehicle, is currently located. The host vehicle is travelling with a velocity and has a current location on a road. The host vehicle is travelling in a current lane of the road. The following space management unit is configured to: obtain a set of parameters comprising one or more of: a difference parameter, indicating a difference between the velocity of and a speed limit for the host vehicle at the current location; and a road marking parameter, indicating whether a road marking on the road indicates that a surrounding vehicle is allowed to enter the current lane. The surrounding vehicle is travelling in a lane of the road. The lane is adjacent to the current lane. Moreover, the following space management unit is configured to determine the following space based on the set of parameters.

The road marking parameter may comprise, or may be indicated by, one or more of: a first line parameter, indicating whether a first line on the road indicates that the surrounding vehicle is allowed to enter the current lane from a left hand side of the host vehicle relative to a travelling direction thereof; and a second line parameter, indicating whether a second line on the road indicates that the surrounding vehicle is allowed to enter the current lane from a right hand side of the host vehicle relative to a travelling direction thereof.

The set of parameters may comprise, or may be indicated by: an average following space parameter, relating to an average time between a plurality of surrounding vehicles in the lane or lanes adjacent to the current lane.

The set of parameters may comprise, or may be indicated by, one or more of: a first set of following space parameters, indicating a first group of a plurality of surrounding vehicles that are travelling in a left lane to the left relatively to a travelling direction of the host vehicle; and a second set of following space parameters for a second group of a plurality of surrounding vehicles that are travelling in a right lane to the right relatively to a travelling direction of the host vehicle.

The following space management may be configured to calculate the following space from the set of parameters by use of a formula.

The following space may be a recorded following space associated with the set of parameters according to a database including sets of parameters associated with recorded following spaces.

The recorded following spaces and the associated set of parameters may be acquired when the following space management unit is active with respect to control of the estimated speed of the host vehicle according to a manually set following space.

Alternatively, the recorded following spaces and the associated set of parameters may be acquired when the following space management unit is inactive with respect to management of the following space.

According to a third aspect, the object is achieved by a host vehicle comprising the following space management unit mentioned above.

Effects and advantages mentioned above for the first aspect applies correspondingly to the following space management unit and the host vehicle according to the second and third aspects.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
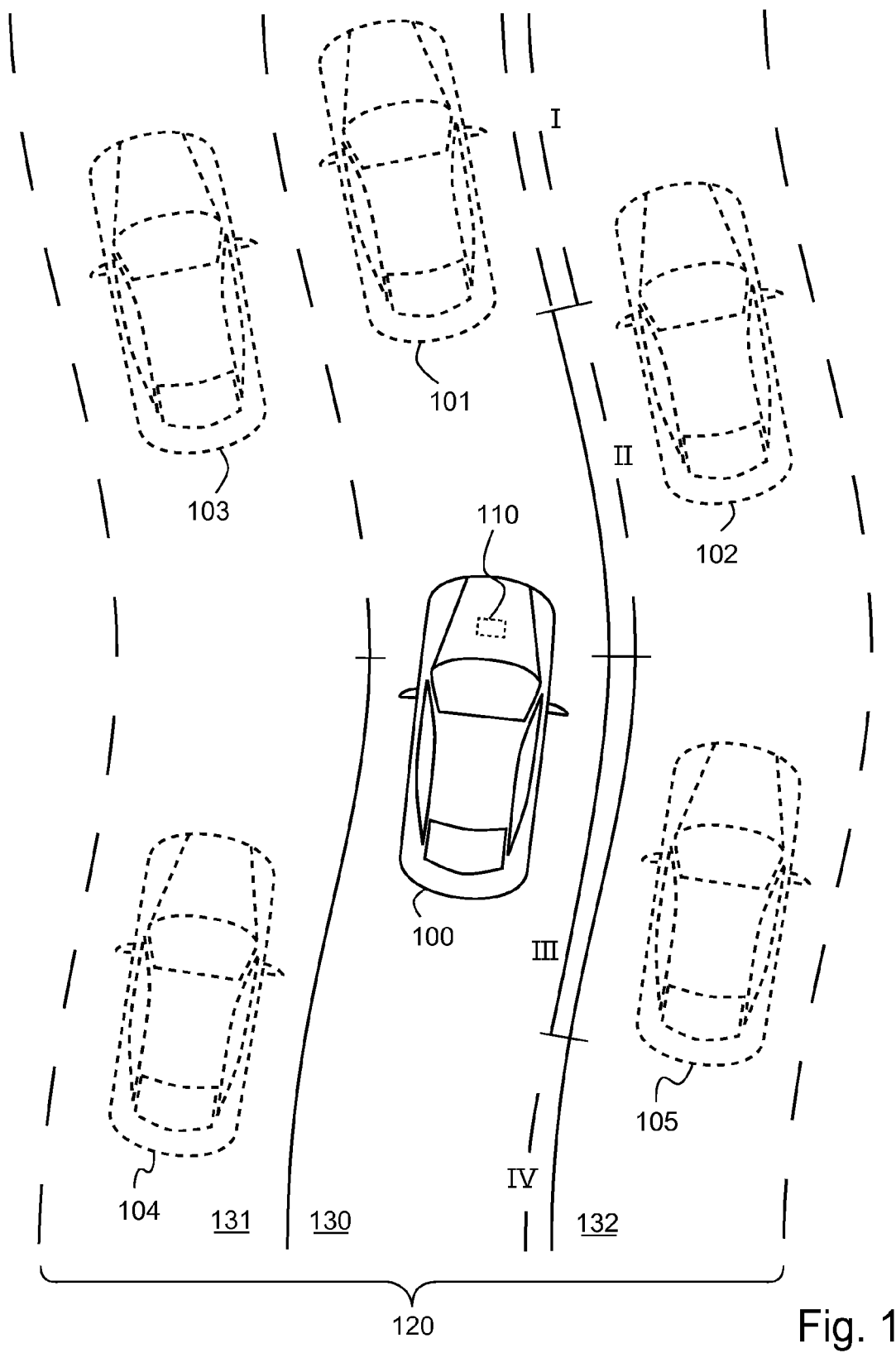
FIG. 1 is a schematic overview illustrating embodiments herein.

As required, detailed embodiments of the present are disclosed herein. However, it is to be understood that the disclosed embodiments are merely exemplary of the disclosure that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Throughout the following description similar reference numerals have been used to denote similar elements, units, modules, vehicles, parameters, circuits, nodes, parts, items or features, when applicable. In the Figures, features that appear in some embodiments are indicated by dashed lines.

FIG. 1 is an exemplifying overview illustrating embodiments herein. A host vehicle 100 is depicted. The host vehicle 100 may be a wheeled vehicle, such as an automobile, a car, a motorcycle, a tricycle, a lorry, a truck, a bus or the like. The host vehicle 100 comprises comprise an exemplifying following space management unit 110, which is described in more detail with reference to FIG. 3 below.

The overview further shows a road 120, such as a street, highway or the like, on which the host vehicle 100 is travelling.

The road 120 may comprise one or more lanes, such as a current lane 130, a left lane 131 and/or a right lane 132. The left and/or right lanes 131, 132 may be referred to as a lane 131, 132.

On the road 120, road markings, such as lines, single lines, double lines and the like, are applied. Observe the road marking on the right hand side of the host vehicle with respect to a travelling direction thereof. In a first section I, double dashed lines are shown to indicate that vehicles may exit or enter the current lane 130. In a second section II, double solid and dashed lines are shown to indicate that vehicles may only enter the current lane 130. In a third section III, double solid lines are shown to indicate that vehicles may not exit or enter the current lane 130. In a fourth section IV, double dashed and solid lines are shown to indicate that vehicles may only exit the current lane 130, but not enter the current lane 130. In this context, it may be worth noticing that a single solid line indicates that the line may not be crossed, not from the left and not from the right. Thus, no lane change is allowed. Further, a single dashed line indicates that lane change is allowed, from the left and from the right of the line.

The host vehicle 100 may follow a preceding vehicle 101, which is located in the current lane 130 in front of the host vehicle 100 with respect to a travelling direction of the host vehicle 100.

The host vehicle 100 may be surrounded by a plurality of surrounding vehicles 102, 103, 104, 105. Any one of the plurality of surrounding vehicles 102, 103, 104, 105 may be referred to as a surrounding vehicle 102, 103, 104, 105. In this example, some of the plurality of surrounding vehicles 102, 103, 104, 105 travels in the left lane 131 and some of the plurality of surrounding vehicles 102, 103, 104, 105 travels in the right lane 132.

Figure 2:
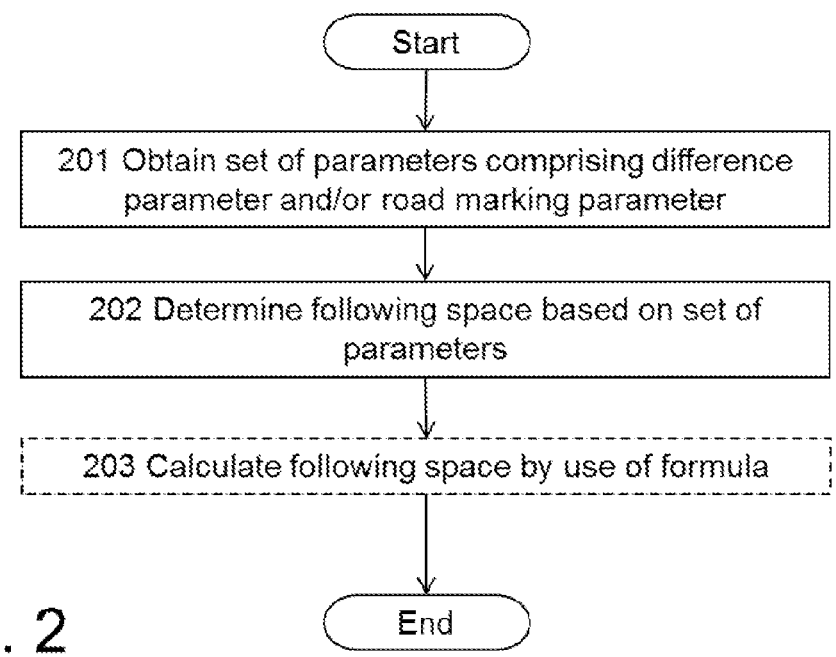
FIG. 2 is a flowchart illustrating embodiments of the method in the following space management unit.

FIG. 2 illustrates an exemplifying method for managing the following space of the host vehicle 100 when implemented in the following space management unit 110 of FIG. 1 and/or the host vehicle 100 of FIG. 1. Thus, the following space management unit 110 of the host vehicle 100 performs a method for managing a following space relating to a time for the host vehicle 100 to reach a preceding vehicle location at which the preceding vehicle 101, preceding the host vehicle 100, is currently located. The host vehicle 100 is travelling with a velocity and has a current location on the road 120. The host vehicle 100 is travelling in the current lane 130 of the road 120.

In some embodiments, a driver of the host vehicle 100 may operate the following space management unit 110 in a manual mode or an automatic mode.

In the manual mode, the driver may select one out of a number of pre-set following spaces. In one example there may be 4 pre-set following spaces, such as 1, 1.5, 2 or 2.5 s. In other examples, the number of pre-set following space and their values may differ from what is given here.

In the automatic mode, the driver allows the following space management unit 110 to determine the following space as described in the following. The automatic mode may be an alternative to the manual mode or an addition thereto.

In the following method, it is assumed that the following space is managed, e.g. controlled, by the following space management unit 110. This means that the following space management unit 110 is operated in the automatic mode.

The following actions may be performed in any suitable order.

Action 201

The following space management unit 110 obtains a set of parameters comprising one or more of:

- a difference parameter, indicating a difference between the velocity and a speed limit for the host vehicle 100 at the current location;
- a road marking parameter, indicating whether a road marking on the road 120 indicates that a surrounding vehicle 102, 103 is allowed to enter the current lane 130. The surrounding vehicle 102, 103 is travelling in a lane 131, 132 of the road 120. The lane 131, 132 is adjacent to the current lane 130; and the like.

The difference parameter may be obtained from map data or Vehicle-to-Infrastructure (V2X) or road-to-vehicle communication. The map data may be available to the following space management unit 110 from a computer readable medium, e.g. a hard disk (HDD) or the like, and/or obtained from a server. The computer readable medium may be comprised in the host vehicle 100. The server may communicate via a wireless communication system, with the host vehicle 100, or more specifically the following space management unit 110. The wireless communication system may be a standardized telecommunication system or the like.

Furthermore, the difference parameter may be obtained by receiving the speed limit from V2X-communication. As an example, the V2X-communication may be provided by means of traffic signs, which includes wireless communication capability in order to send information about the traffic sign. For example, a traffic sign regarding applicable speed limit may send the value of the speed limit by means of the wireless communication capability to e.g. the host vehicle 100 and other vehicles.

The difference parameter may be obtained through the traffic sign speed limit being read by a camera sensor comprised in the host vehicle 100. Then, the difference parameter may e.g. be calculated as a ratio between the velocity and the applicable speed limit.

The road marking parameter may also be obtained from the camera sensor comprised in the host vehicle 100. The camera sensor may thus capture and analyse one or more images of a road surface of the road 120 in order identify different kinds of road markings. The different kinds of road markings may indicate whether the surround vehicle 102, 103, 104, 105 is allowed to enter the current lane 130. The exact appearance of the road markings may be different for different countries; some examples are given above with reference to FIG. 1. This kind of capturing and analysing of the images of the road surface may sometimes be referred to as lane tracking, i.e. a type of lane is tracked. The type of the lane may refer to whether entrance/exit to/from the lane is allowed to the left and/or right.

In case the set of parameters comprises the road marking parameter, the road marking parameter may comprise, or may be indicated by, one or more of:
- a first line parameter, indicating whether a first line on the road 120 indicates that the surrounding vehicle 102, 103 is allowed to enter the current lane 130 from a left hand side of the host vehicle 100 relative to a travelling direction thereof;
- a second line parameter, indicating whether a second line on the road 120 indicates that the surrounding vehicle 102, 103 is allowed to enter the current lane 130 from a right hand side of the host vehicle 100 relative to a travelling direction thereof; and the like.

As previously mentioned, the first line parameter and the second line parameter makes it possible to distinguish whether entry of the surrounding vehicle is allowed from the left and/or right hand side of the vehicle. Typically, in case cars travel on the right hand side of the road, vehicles may be allowed into the current lane from the right more generously than from the left. In this manner, greater consideration may e.g. be taken towards vehicles entering a multi-lane highway or the like.

Moreover, the set of parameters may comprise an average following space parameter relating to an average time between the plurality of surrounding vehicles 102, 103, 104, 105 in the lane 131, 132 or lanes adjacent to the current lane 130. In more detail, the average time may relate to an average over those of the plurality of surrounding vehicles 102, 103, 104, 105 for which a respective following space has been determined.

The set of parameters may comprise one or more of:
- a first set of following space parameters, indicating a first group of a plurality of surrounding vehicles 102, 103, 104, 105 that are travelling in a left lane to the left of the host vehicle 100 relatively to a travelling direction thereof;
- a second set of following space parameters for a second group of a plurality of surrounding vehicles 102, 103, 104, 105 that are travelling in a right lane to the right of the host vehicle 100 relatively to a travelling direction thereof; and the like.

As previously mentioned, the first and second sets of following space parameters allows for different treatment, or consideration, towards vehicles in the right and left lanes. For example, let's assume the following spaces of the first set of following space parameters indicate that traffic in the left lane is more compact, i.e. small following spaces, than traffic in the right lane as given by the second set of following space parameters. Then, the following space management unit 110 may be more prone to allow one of the surrounding vehicles in the left lane to enter the current lane 130 than to allow one of the surrounding vehicles in the right lane to enter the current lane 130. In this manner, following space in the right and left lanes may be evened out.

Action 202

The following space management unit 110 determines the following space based on the set of parameters.

As a first example, the following space may be determined adaptively by use of a database. In this example, the following space may be a recorded following space associated with the set of parameters according to the database, which includes sets of parameters associated with recorded following spaces.

The database may be generated during normal driving, which means that the following space is controlled by the driver, not the following space management unit 110. Hence, the following space management unit 110 is inactive with respect to management of the following space. In this example, the following space management unit merely acquires the recorded following spaces and the associated set of parameters.

Alternatively or additionally, the database may be generated when the following space management unit 110 is active with respect to control of the estimated speed of the host vehicle 100 according to a manually set following space. Typically, the driver may choose from a number of pre-set following spaces. The recorded following spaces corresponds to those pre-set following spaces which the driver has chosen when operating the following space management unit 110 in manual mode. In this example, the following space management unit 110 acquires the recorded following spaces and the associated set of parameters while the driver is allowed to choose the following space which the following space management unit maintains.

Alternatively or additionally, the follow space may be determined as in a second example as described below in action 203.

Action 203

In the second example, the following space management unit 110 may calculate the following space from the set of parameters by use of a formula.

In the following example, the formula is given by equation 1 and the following space is give as a Time Gap (TG) in terms of seconds.

$$TG[s] = X0 + X1 + X2 + X3 \qquad \text{Equation 1:}$$

It shall first be said that high, low, greater than and less than are all relative terms which shall be seen in relation to a corresponding threshold value and/or ranges mentioned below.

In equation 1:

TG is the Time Gap value $\epsilon[1\ 3]$ seconds (s).

X0 is a default time value as a function of current speed $\epsilon[1\ 3]$ s. A lower speed of the host vehicle, v (velocity) gives, or implies, a low value of X0.

X1 is a function of number of adjacent lanes with cut in possibility ∈[−0.3 0.3] s. A single lane gives a high value of X1, and multiple lanes gives a low value of X1.

X2 is a function of speed of the host vehicle and mean speed of the host vehicle divided by speed limit at the current location ∈[−0.3 0.3] s.

A low speed and high mean speed/speed limit gives a middle value, e.g. zero in the range −0.3 to 0.3, of X2.

A low speed and low mean speed/speed limit gives a low value of X2.

A high speed and high mean speed/speed limit gives a high value of X2.

A high speed and low mean speed/speed limit gives a low value of X2.

X3 is a function of speed and average time gap used by other vehicles in adjacent lanes ∈[−0,3 0,3] s.

A great Time Gap in low speed gives a high value of X3.
A small Time Gap in low speed gives a low value of X3.
A great Time Gap in high speed gives a high value of X3.
A small Time Gap in high speed gives a middle value of X3.

In another example, the formula is given by equation 2 and the following space is give as a Time Gap (TG) in terms of seconds.

$$TG[s] = (W0*X0 + W1*X1 + W2*X2 + W3*X3)/4 \quad \text{Equation 2:}$$

X0, X1, X2 and X3 are defined as above.

W0, W1, W2 and W3 are weight factors which may be set such as to emphasize one or more of X0, X1, X2 and X3 by applying a corresponding weight factor that is substantially greater then at least one other weight factor.

Figure 3:
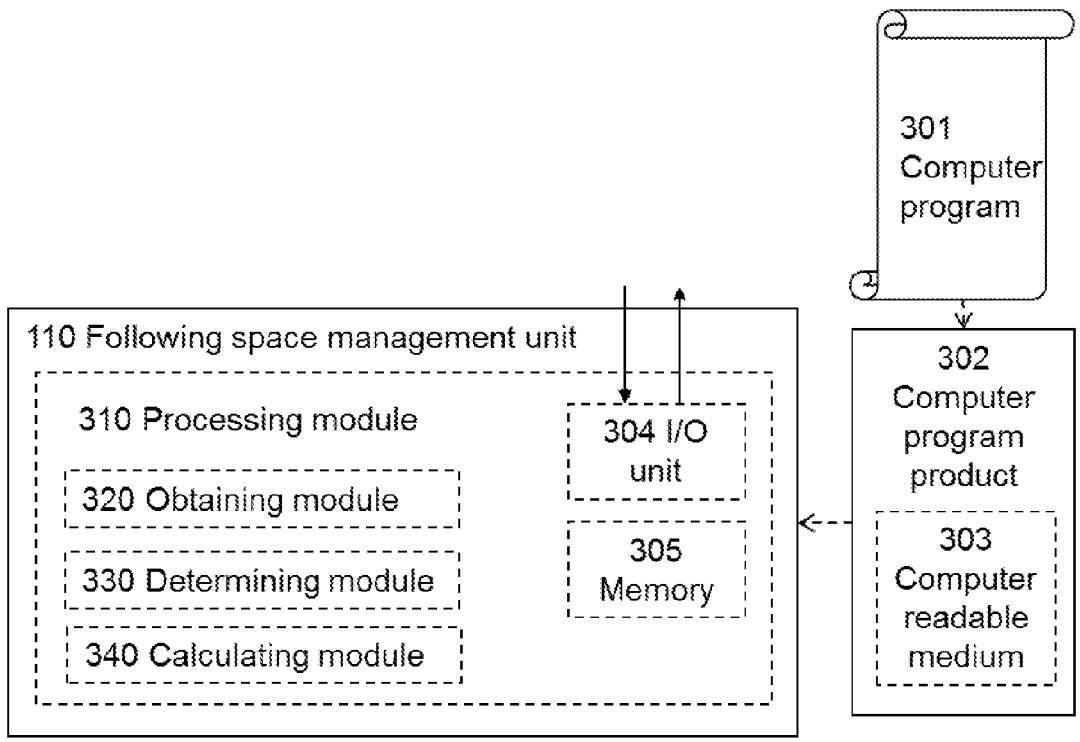
FIG. 3 is a block diagram illustrating embodiments of the following space management unit.

With reference to FIG. 3, a schematic block diagram of the following space management unit 110 for the host vehicle 100 is shown. Hence, the following space unit 110 may be comprised in, mounted in, installed into etc., the host vehicle 100. Furthermore, the following space management unit 110 may be an ACC (not shown in the Figure), may be comprised in an ACC or may be connected, by wired or wireless connection to an ACC. The ACC may be any kind of device provided similar functionality as the ACC.

The following space management unit 110 is configured to perform the method in FIG. 2. Thus, the following space management unit 110 is configured to manage a following space relating to a time for the host vehicle 100 to reach a preceding vehicle location at which a preceding vehicle 101, preceding the host vehicle 100, is currently located. The host vehicle 100 is travelling with a velocity and has a current location on the road. The host vehicle 100 is travelling in the current lane 130 of the road 120.

According to some embodiments herein, the following space management unit 110 may comprise a processing module 310. In further embodiments, the processing module 310 may comprise one or more of an obtaining module 320, a determining module 330, and a calculating module 340 as described below.

The following space management unit 110, the processing module 310 and/or the obtaining module 320 is configured to obtain a set of parameters comprising one or more of:

a difference parameter, indicating a difference between the velocity of and a speed limit for the host vehicle 100 at the current location; and a road marking parameter, indicating whether a road marking on the road 120 indicates that a surrounding vehicle 102, 103 is allowed to enter the current lane 130. The surrounding vehicle 102, 103 is travelling in a lane 131, 132 of the road 120. The lane 131, 132 is adjacent to the current lane 130.

Furthermore, the following space management unit 110, the processing module 310 and/or the determining module 330 is configured to determine the following space based on the set of parameters.

The following space management unit 110, the processing module 310 and/or the calculating module 340 may be configured to calculate the following space from the set of parameters by use of a formula.

As mentioned, when the set of parameters may comprise the road marking parameter, the road marking parameter may comprise one or more of:

a first line parameter, indicating whether a first line on the road 120 indicates that the surrounding vehicle 102, 103 is allowed to enter the current lane 130 from a left hand side of the host vehicle 100 relative to a travelling direction thereof and a second line parameter, indicating whether a second line on the road 120 indicates that the surrounding vehicle 102, 103 is allowed to enter the current lane 130 from a right hand side of the host vehicle 100 relative to a travelling direction thereof As mentioned, the set of parameters may comprise: an average following space parameter, relating to an average time between a plurality of surrounding vehicles 102, 103, 104, 105 in the lane or lanes adjacent to the current lane 130.

As mentioned, the set of parameters may comprise one or more of: a first set of following space parameters, indicating a first group of a plurality of surrounding vehicles 102, 103, 104, 105 that are travelling in a left lane to the left relatively to a travelling direction of the host vehicle 100; and a second set of following space parameters for a second group of a plurality of surrounding vehicles 102, 103, 104, 105 that are travelling in a right lane to the right relatively to a travelling direction of the host vehicle 100.

As mentioned, the following space may be a recorded following space associated with the set of parameters according to a database including sets of parameters associated with recorded following spaces.

As mentioned, the recorded following spaces and the associated set of parameters may be acquired when the following space management unit 110 is active with respect to control of the estimated speed of the host vehicle 100 according to a manually set following space, or alternatively the recorded following spaces and the associated set of parameters may be acquired when the following space management unit 110 is inactive with respect to management of the following space.

The following space management unit 110 may further comprise an Input/output (I/O) unit 304 configured to send and/or receive the set of parameters and other messages, values, indications and the like as described herein. The I/O unit 304 may comprise a transmitter and/or a receiver.

Furthermore, the following space management unit 110 may comprise a memory 305 for storing software to be executed by, for example, the processing module when the processing module is implemented as a hardware module comprising at least one processor or the like.

FIG. 3 also illustrates software in the form of a computer program 301 for managing the following space. The computer program 301 comprises computer readable code units which when executed on the following space management unit 110 causes the following space management unit 110 to perform the method according to FIG. 2.

Finally, FIG. 3 illustrates a computer program product 302, comprising computer readable medium 303 and the computer program 301 as described directly above stored on the computer readable medium 303.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method, performed by a following space management unit of a host vehicle, for managing a following space relating to a time for the host vehicle to reach a preceding vehicle location at which a preceding vehicle, preceding the host vehicle, is currently located, wherein the host vehicle is travelling with a velocity and has a current location on a road, and wherein the host vehicle is travelling in a current lane of the road, the method comprising:
   obtaining a set of parameters comprising
   a difference parameter indicating a difference between the velocity of and a road speed limit for the host vehicle at the current location; and
   determining the following space based on the set of parameters, thereby controlling the following space.

2. The method according to claim 1, wherein the set of parameters comprises:
   an average following space parameter relating to an average time between a plurality of surrounding vehicles in the lane or lanes adjacent to the current lane, wherein the average time relates to average over those of the plurality of surrounding vehicles for which a respective following space has been determined.

3. The method according to claim 1, wherein the determining of the following space comprises:
   calculating the following space from the set of parameters by use of a formula.

4. The method according to claim 1, wherein the following space is a recorded following space associated with the set of parameters according to a database including sets of parameters associated with recorded following spaces, wherein determining of the following space is performed by looking up the set of parameters in the database to find the recorded following space associated with the set of parameters.

5. The method according to claim 4, wherein the recorded following spaces and the associated set of parameters are acquired when the following space management unit is active with respect to control of an estimated speed of the host vehicle according to a following space which is set manually, wherein the following space management unit is operating in a manual mode in which the following space is selected by a driver of the host vehicle out of a number of pre-set following spaces, or
   wherein the recorded following spaces and the associated set of parameters are acquired when the following space management unit is inactive with respect to management of the following space.

6. A following space management unit for managing a following space relating to a time for a host vehicle to reach a preceding vehicle location at which a preceding vehicle, preceding the host vehicle, is currently located, wherein the host vehicle is travelling with a velocity and has a current location on a road, and wherein the host vehicle is travelling in a current lane of the road, the following space management unit configured to:
   obtain a set of parameters comprising a difference parameter indicating a difference between the velocity of and a road speed limit for the host vehicle at the current location;
   determine the following space based on the set of parameters; and
   control the following space based on the determined following space.

7. The following space management unit according to claim 6, wherein the set of parameters comprises:
   an average following space parameter, relating to an average time between a plurality of surrounding vehicles in the lane or lanes adjacent to the current lane, wherein the average time relates to average over those of the plurality of surrounding vehicles for which a respective following space has been determined.

8. The following space management unit according to claim 6, wherein the following space management is configured to calculate the following space from the set of parameters by use of a formula.

9. The following space management unit according to claim 6, wherein the following space is a recorded following space associated with the set of parameters according to a database including sets of parameters associated with recorded following spaces, wherein the following space management unit is configured to determine the following space by looking up the set of parameters in the database to find the recorded following space associated with the set of parameters.

10. The following space management unit according to claim 9, wherein the recorded following spaces and the associated set of parameters are acquired when the following space management unit is active with respect to control of the estimated speed of the host vehicle according to a manually set following space, wherein the following space management unit is operated in a manual mode in which the following space is selected by a driver of the host vehicle out of a number of pre-set following spaces, or wherein the recorded following spaces and the associated set of parameters are acquired when the following space management unit is inactive with respect to management of the following space.

11. A host vehicle comprising a following space management unit according to claim 6.

12. A non-transitory computer readable memory having computer executable instructions stored therein for managing a following space relating to a time for a host vehicle to reach a preceding vehicle location at which a preceding vehicle, preceding the host vehicle, is currently located, wherein the host vehicle is travelling with a velocity and has a current location on a road, and wherein the host vehicle is travelling in a current lane of the road, the computer executable instructions comprising instruction for:

obtaining a set of parameters comprising
a difference parameter indicating a difference between the velocity of and a road speed limit for the host vehicle at the current location; and
determining the following space based on the set of parameters for use in controlling the following space.

* * * * *